(12) United States Patent
Vuletic

(10) Patent No.: US 8,016,910 B2
(45) Date of Patent: Sep. 13, 2011

(54) METHOD FOR PRODUCING LIQUID PIG IRON OR LIQUID STEEL INTERMEDIATE PRODUCTS FROM FINE-PARTICLED MATERIAL CONTAINING IRON OXIDE

(75) Inventor: Bogdan Vuletic, Düsseldorf (DE)

(73) Assignee: Siemens Vai Metals Technologies GmbH (AT)

( * ) Notice: Subject to any disclaimer, the term of this patent is extended or adjusted under 35 U.S.C. 154(b) by 317 days.

(21) Appl. No.: 12/298,592

(22) PCT Filed: Apr. 19, 2007

(86) PCT No.: PCT/EP2007/003426
§ 371 (c)(1),
(2), (4) Date: Dec. 1, 2008

(87) PCT Pub. No.: WO2007/124870
PCT Pub. Date: Nov. 8, 2007

(65) Prior Publication Data
US 2009/0090217 A1    Apr. 9, 2009

(30) Foreign Application Priority Data

Apr. 28, 2006  (AT) .................................. A 732/2006

(51) Int. Cl.
*C21B 11/00* (2006.01)
*C21B 13/10* (2006.01)
*C21C 5/40* (2006.01)
(52) U.S. Cl. ................ 75/450; 75/500; 75/505
(58) Field of Classification Search .................... 75/450, 75/505, 500
See application file for complete search history.

(56) References Cited

U.S. PATENT DOCUMENTS 5,445,668 A    8/1995   Kepplinger et al.
(Continued)

FOREIGN PATENT DOCUMENTS

| DE | 373944 | 4/1923 |
|---|---|---|
| DE | 42 40 194 C1 | 6/1994 |
| EP | 0 576 414 A | 12/1993 |

(Continued)

OTHER PUBLICATIONS

International Search Report dated Dec. 18, 2007, issued in corresponding international application No. PCT/EP2007/003426.

*Primary Examiner* — George Wyszomierski
*Assistant Examiner* — Tima M McGuthry-Banks
(74) *Attorney, Agent, or Firm* — Ostrolenk Faber LLP

(57) ABSTRACT

A method for producing liquid pig iron or liquid steel intermediate products from fine-particled material containing iron oxide. The fine-particled material is prereduced in at least one prereduction stage and reduced in a final reduction stage to sponge iron. The sponge iron is melted in a melt-down gasification zone, with carbon carriers and oxygen-containing gas supplied. A CO- and $H_2$-containing reduction gas is generated and introduced into the final reduction stage, is converted there, is drawn off and introduced into at least one prereduction stage, converted there and drawn off. A first quantity fraction of the fine-particled material containing iron oxide is introduced into a melt-down gasification zone via at least one prereduction stage and one final reduction stage, and a further quantity fraction of the fine-particled material containing iron oxide is introduced into the melt-down gasification zone directly or together with the carbon carriers and the oxygen-containing gas.

8 Claims, 1 Drawing Sheet

| U.S. PATENT DOCUMENTS | | | | |
|---|---|---|---|---|
| 5,785,733 A * | 7/1998 | Lee et al. | | 75/444 |
| 5,948,139 A * | 9/1999 | Kepplinger et al. | | 75/443 |
| 6,395,052 B1 * | 5/2002 | Schrey et al. | | 75/10.38 |
| 2003/0159541 A1 * | 8/2003 | Kepplinger et al. | | 75/450 |

FOREIGN PATENT DOCUMENTS

| EP | 0 969 107 A | 1/2000 |
|---|---|---|
| WO | WO 99/32668 A | 7/1999 |

\* cited by examiner

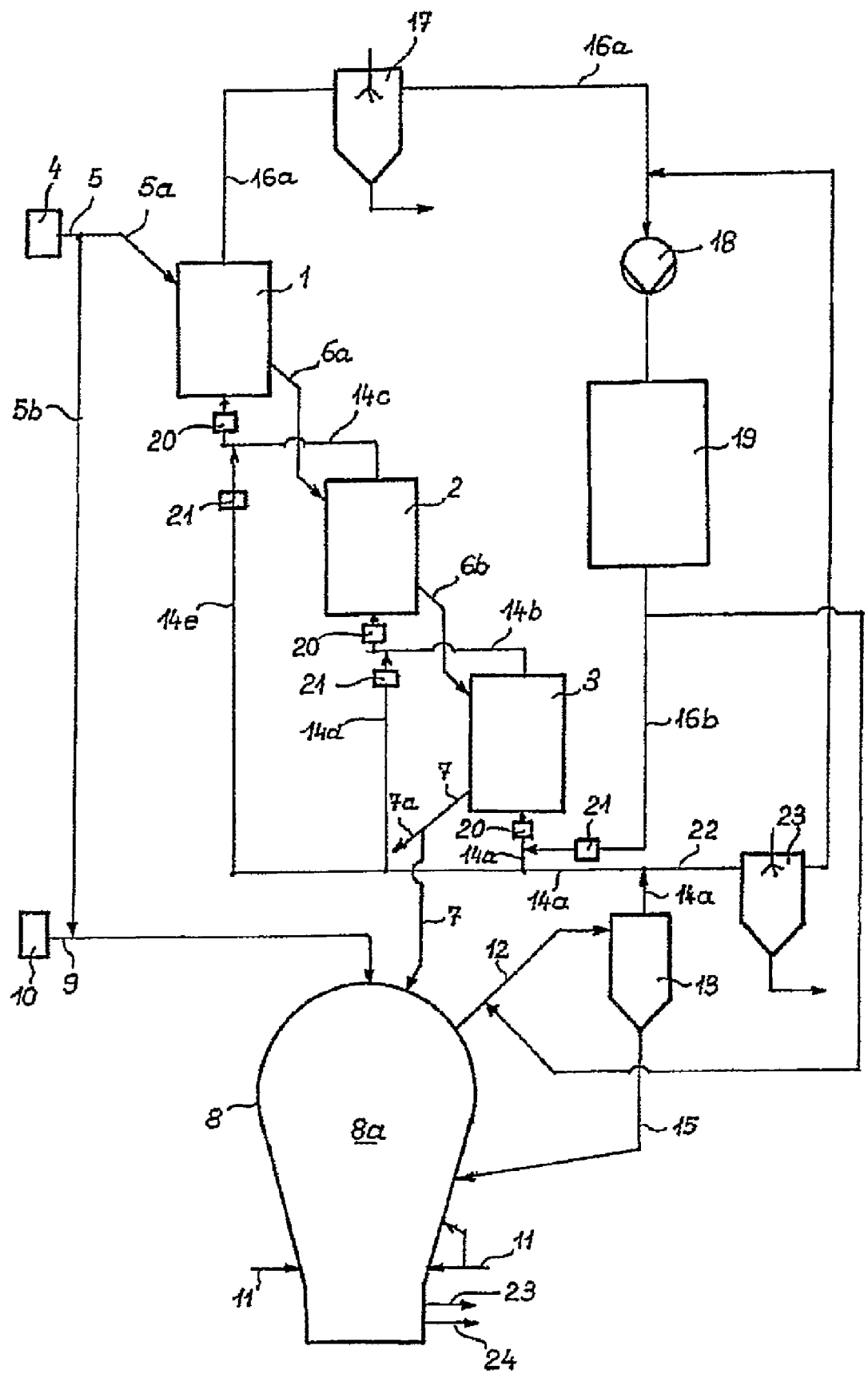

METHOD FOR PRODUCING LIQUID PIG IRON OR LIQUID STEEL INTERMEDIATE PRODUCTS FROM FINE-PARTICLED MATERIAL CONTAINING IRON OXIDE

CROSS REFERENCE TO RELATED APPLICATION

The present application is a 35 U.S.C. §§371 national phase conversion of PCT/EP2007/003426, filed 19 Apr. 2007, which claims priority of Austrian Application No. A732/2006, filed 28 Apr. 2006. The PCT International Application was published in the German language.

BACKGROUND OF THE INVENTION

The invention relates to a method for producing liquid pig iron or liquid steel intermediate products from fine-particled material containing iron oxide. The fine-particled material containing iron oxide is prereduced in at least one prereduction stage with the aid of a reduction gas and is subsequently reduced in a final reduction stage to a sponge iron. The sponge iron is melted in a melt-down gasification zone, with carbon carriers and oxygen-containing gas being supplied. A CO- and $H_2$-containing reduction gas is generated. That gas is introduced into the final reduction stage, is converted there, is drawn off, is subsequently introduced into at least one prereduction stage, is converted there and is drawn off. The invention relates, further, to an apparatus for carrying out this method.

A method of this type is already known, for example, from EP 969 107 A1. In this, in order to reduce fine ore to sponge iron, usually a plurality of fluidized bed reactors are used which are arranged in a cascade. The fine ore particles have a very pronounced tendency to agglomeration during reduction in the fluidized bed reactors. This effect occurs to an increased extent with a rising degree of fineness of the ore particles, with rising reduction gas temperatures and with a rising degree of metallization. For this reason, it has been possible hitherto to implement industrially, and with acceptable outlay in terms of cleaning and maintenance and acceptable availability of the plant, only those fluidized bed processes which were being operated with a relatively low degree of metallization of the sponge iron of about 70% or with coarser fine ore (0-10 mm) and reduction gas temperatures of below 800° C. for the last fluidized bed reactor and of between 700° C. and 760° C. for the prereduction reactors. However, a relatively low reduction gas temperature entails the disadvantage of a correspondingly lower introduction of heat. In addition, heat losses at the individual fluidized bed reactors and the connecting pipelines between the fluidized bed reactors occur which are higher, comparatively, than in the reduction of lump ore in a reduction shaft. The reduction gas temperature required for an optimal metallization process in the individual fluidized bed reactors connected in series can therefore be maintained to only a restricted extent without the supply of additional energy.

This energy deficit can be compensated by means of various additional measures. The energy introduction which is additionally necessary can be covered by means of a higher specific reduction gas quantity per ton of burden or by means of an additional partial combustion of CO and $H_2$ by oxygen being injected. In addition to a higher introduction of sensible heat, what is also achieved by increasing the specific reduction gas quantity is that less CO and $H_2$ has to be burnt in the connecting lines between the fluidized bed reactors, in order to raise the reduction gas temperature to an optimal value for the following fluidized bed reactor. Further, what is achieved by an increased specific reduction gas quantity is that, owing to the partial combustion of CO and $H_2$, the reduction potential of the reduction gas does not undershoot a predetermined limit value for the fluidized bed reactor following in each case, so that a relatively high degree of metallization, even of larger iron ore particles requiring a longer dwell time in the reducing atmosphere than the smaller ore particles, is achieved.

In a melt reduction method in one or more fluidized bed reactors connected in series, such as is known, for example, from EP 969 107 A1, the reduction gas required for reducing the iron oxides and for calcining the aggregates is produced in a melt-down gasifier, using coal as a gasification agent and oxygen or oxygen-enriched air as oxidizing agent. The heat occurring during the gasification process is used in the melt-down gasifier for melting sponge iron and the necessary aggregates into pig iron and slag which are tapped at specific time intervals. When a melt-down gasifier is coupled to a reduction shaft furnace, as takes place in the COREX® method, if coals with a fraction of volatile constituents of above 27% are used, the reduction gas quantity produced in the melt-down gasifier is sufficient for a steady-state operation of the reduction shaft. When a melt-down gasifier is coupled to fluidized bed reactors, optimized operation can be achieved only by means of additional measures already described above, such as a higher specific reduction gas quantity and partial combustion of CO and $H_2$.

So that the fluidized bed reactors can be operated with higher specific reduction gas quantities, the possibility is likewise already known of either drawing off purified blast furnace gas from the fluidized bed reactors of a $CO_2$ removal plant and delivering it to the reduction process again or operating the melt-down gasifier with highly volatile coals. The use of gasification agents with a high fraction of volatile constituents and with a low calorific value requires very high specific consumptions of gasification and oxidizing agents and entails very high specific slag rates and is therefore uneconomical. For technical and economic reasons, therefore, the production of increased reduction gas quantities via the gas processing plant is preferred. However, due to the relatively low output of blast furnace gas (off gas) in a $CO_2$ removal plant, in the case of coals with a low fraction of volatile constituents, the additional gas quantity generated according to this method is not sufficient for producing the sponge iron with relatively uniform metallization, particularly not in the case of low specific fuel consumptions, such as are desired per se.

SUMMARY OF THE INVENTION

The present invention is aimed at avoiding these disadvantages and difficulties, and its set object is to develop further the method described above and an apparatus for producing liquid pig iron or liquid steel intermediate products from fine-particled material containing iron oxide, to the effect that the melt-down gasifier can be operated with a higher power output than the fluidized bed reactors assigned to it and the production process consequently proceeds in a more stable way. Further, the necessity for carrying out an energy introduction and the combustion of CO and $H_2$ in the connecting pipelines between the fluidized bed reactors is to be appreciably reduced or at least largely avoided.

This object is achieved, according to the invention, in that a quantity fraction of the fine-particled material containing iron oxide is introduced into a melt-down gasification zone via at least one prereduction stage and one final reduction stage, and a further quantity fraction of the fine-particled material containing iron oxide is introduced into the melt-down gasification zone directly or together with the carbon carriers and the oxygen-containing gas.

Owing to the quantitative and qualitative increase in reduction gas production achieved consequently in the melt-down gasifier, the necessity for the additional CO and $H_2$ combustion between the successive fluidized bed reactors is reduced. Since the reduction potential of the reduction gas is diminished due to such partial combustion of CO and $H_2$ into $CO_2$ and $H_2O$, a rise in the degree of metallization of the fine ore is also achieved by means of this measure.

Reduction potential of the reduction gas is diminished due to such partial combustion of CO and $H_2$ into $CO_2$ and $H_2O$, a rise in the degree of metallization of the fine ore is also achieved by means of this measure.

For economic reasons, it is even expedient to produce in the melt-down gasifier larger reduction gas quantities with a low content of oxidizing components ($CO_2$ and $H_2O$) than are required for a balanced operation of the melt-down gasifier and of the fluidized bed reactors. The reason for this is the demand for additional sponge iron or hot-briquetting iron (HBI) during the start-up phase and during the heating of the fluidized bed reactors, including the heating and postreduction of the fluidized bed material. As is known, at least the last two, in most cases all, fluidized bed reactors connected in series have to be emptied during each stoppage which lasts longer than 2 hours, in order to avoid the agglomeration of the material used and a longer plant stoppage resulting from this. Even in the case of short stoppages, the melt-down gasifier is operated for up to 8 hours, in the case of longer stoppages, for up to 12 hours and, during the cleaning of fluidized bed reactors, for about 4 days with bought-in HBI. In light of this relatively high demand for costly bought-in HBI, it is therefore more economical to branch off continuously a part quantity of the produced sponge iron in the form of HBI or HCI (hot-compacted iron) during the production operation and to introduce it as cold intermediate product into the melt-down gasifier in the stoppage situations described above.

To cover this additional demand and ensure a stable operation of the method, the quantity fraction, introduced into the melt-down gasification zone directly or together with the carbon carriers and the oxygen-containing gas, of the fine-particled material containing iron oxide amounts to 10% to 20% of the overall quantity of the fine-particled material containing iron oxide which is used.

A particularly beneficial composition of the reduction gas leaving the melt-down gasification zone is achieved when the melt-down gasification zone is supplied with carbon carriers and oxygen-containing gas in a quantity such that the fraction of $CO_2$ in the reduction gas leaving the melt-down gasification zone lies in a range of 4% to 9%, preferably in a range of less than 6%.

According to an advantageous embodiment of the method, the reduction gas emerging from the melt-down gasification zone is subjected to hot dedusting and is subsequently supplied to the final reduction stage and preferably to all the prereduction stages with a specific reduction gas quantity which is increased, preferably is increased by 10%. Thus, in the prereduction stages, hot processed reduction gas is admixed in bypass to the colder reduction gas stream from the final reduction stage or to the colder reduction gas stream from the last prereduction stage, and the heat content of the mixed gas is increased. Owing to the admixing operation, a deliberate setting of the reduction gas temperature can be carried out directly upstream of the respective reduction stage.

In fine ore reduction plants according to the prior art, the fluidized bed reactors are cleaned at time intervals of 2 to 2.5 months, in order to remove blockages and caking of sponge iron, thus resulting, during each operational stoppage, in loss of production of about 4 days.

Blockages and caking of sponge iron in the reactor cyclones of the finish reduction stage occur more quickly and more frequently when the reactor is operating with high reduction gas quantities and high reduction gas temperatures. The same also applies in a similar way to the gas distributor nozzles, since the flow passes through these at higher gas velocities. An arbitrary increase in the reduction gas quantity and in the reduction gas temperature is therefore not conducive to achieving the desired aim. A balance between the advantages and disadvantages is reached when, after hot dedusting, a part quantity of at least 70% of the processed reduction gas is supplied to the final reduction stage and a part quantity of up to 30% is supplied directly to the prereduction stages.

Particularly beneficial conditions for the reduction operation in the prereduction stages, particularly in the second prereduction stage, are achieved when 5% to 15%, preferably about 10%, of the processed reduction gas is admixed to the reduction gas leaving the final reduction stage before entry into the preceding prereduction stage.

It has proved advantageous that, after hot dedusting, the process reduction gas is set at a higher temperature than is necessary for the finish reduction of the fine-particled material containing iron oxide in the final reduction stage. This extra demand for sensible heat can be covered, for the most part, by the available sensible heat of the reduction gas emerging from the melt-down gasification zone. For this purpose, it is necessary to cool the generator gas at the gasifier outlet to a lesser extent (for example, to 880/900° C. instead of, as is customary, to 800/820° C.). A fine setting of the reduction gas temperature for the final reduction stage takes place by means of the metered addition of the processed blast furnace gas drawn off from the preferably first prereduction stage.

The sponge iron which is required during the run-down phase and during the heating of the fluidized bed reactors and which is produced continuously as an intended excess quantity during the continuous operation of the plant is continuously extracted from the final reduction stage. In this case, a part quantity of about 5% to 15%, preferably about 10%, of the generated overall quantity of sponge iron is extracted from the final reduction stage and cooled.

A plant for producing liquid pig iron or liquid steel intermediate products from the fine-particled material containing iron oxide has at least two fluidized bed reactors connected in series one behind the other. Fine-particled material containing iron oxide is guided from fluidized bed reactor to fluidized bed reactor via conveying lines in one direction, and the reduction gas is guided from fluidized bed reactor to fluidized bed reactor via reduction gas connecting lines in the opposite direction. The plant has a melt-down gasifier, into which issues a conveying line guiding the sponge iron out of the fluidized bed reactor arranged last in the direction of flow of the fine-particled material containing iron oxide. There is a reduction gas discharge line, issuing into the fluidized bed reactor arranged last in the direction of flow of the material containing iron oxide, for reduction gas formed in the melt-down gasifier. The plant is characterized in that a first branch conveying line for a quantity fraction of the fine-particled material containing iron oxide is formed by a conveying line from fluidized bed reactor to fluidized bed reactor and a subsequent conveying line to the melt-down gasifier, and a second branch conveying line for a further quantity fraction of the fine-particled material containing iron oxide is formed by a connecting conveying line from a feed device directly into the melt-down gasifier.

According to a preferred embodiment to the invention, the second branch conveying line for the further quantity fraction of the fine-particled material containing iron oxide issues into a connecting conveying line from a feed device to the supply line for carbon carriers and for oxygen-containing gases into the melt-down gasifier. This makes it possible to have a metered and mutually coordinated introduction of material containing iron oxide, of carbon carriers and of oxygen-containing gas.

For generating the intended increased reduction gas quantity, the second branch conveying line is designed for conducting 10% to 15% of the overall quantity of the fine-particled material containing iron oxide which is used.

The metered addition of blast furnace gas, which is preferably sucked away from the first prereduction stage and processed, and is added to the processed reduction gas from the melt-down gasifier is expediently achieved in that a hot-dedusting plant, preferably a hot-gas cyclone, is connected into the reduction gas discharge line, a temperature measurement device for detecting the reduction gas temperature is arranged in the reduction gas discharge line, and a blast furnace gas line issues on the outlet side of the $CO_2$ removal plant, wherein that gas line has an inflow-quantity regulation device for setting the reduction gas temperature in the reduction gas discharge line leading to the fluidized bed reactor of the final reduction stage.

The setting of the reduction gas temperature before entry into the fluidized bed reactors of the prereduction stages is carried out in that, in addition to the reduction gas connecting lines leading from fluidized bed reactor to fluidized bed reactor and in addition to the reduction gas discharge line leading to the fluidized bed reactor, individual reduction gas connecting lines are provided between the reduction gas discharge line and the at least one fluidized bed reactor of the prereduction stage. These reduction gas connecting lines are assigned quantity regulation devices for the metered admixing of reduction gas.

The last of the series-connected fluidized bed reactors, in which the final reduction of the material containing iron oxide takes place, is assigned, in addition to a conveying line for the transfer of sponge iron into the melt-down gasifier, an additional conveying line for extracting a part quantity of the sponge iron, and the additional conveying line leads to a cooling device. This sponge iron set aside and kept in stock is used again in the event of operational interruptions.

BRIEF DESCRIPTION OF THE DRAWING

The invention is explained by way of example with reference to an exemplary embodiment illustrated in the drawing, FIG. 1 showing an advantageous embodiment of the method according to the invention and of the apparatus according to the invention in a block diagram.

DESCRIPTION OF A PREFERRED EMBODIMENT

The plant according to the invention comprises three series-connected fluidized bed reactors 1, 2, 3. Material containing iron oxide is supplied in the form of fine ore from an ore feed device 4 via an ore supply line 5 and a branch conveying line 5a to the first fluidized bed reactor 1 in which a preheating of the fine ore and a first prereduction take place in the first prereduction stage. Subsequently, a transfer of the pretreated fine ore takes place via a conveying line 6a into the fluidized bed reactor 2 and via a further conveying line 6b into the fluidized bed reactor 3. In the fluidized bed reactor 2, the second prereduction stage, a further prereduction of the fine ore takes place, and, in the fluidized bed reactor 3, the final reduction stage, the final reduction of the fine ore to sponge iron takes place.

Sponge iron is extracted from the fluidized bed reactor 3 and is conducted via a conveying line 7 into the melt-down gasifier 8. To increase the production of reduction gas in the melt-down gasifier 8, material containing iron oxide is introduced directly into the melt-down gasifier 8 through a second branch conveying line 5b. This branch conveying line issues into a connecting conveying line 9 through which coal is introduced directly into the melt-down gasifier 8 by a feed device 10. If appropriate, air is used as carrier gas. A part quantity of the sponge iron produced is branched off from the fluidized bed reactor 3 via the conveying line 7a and is supplied to a cooling device, not illustrated in any more detail, cooled there and stored. This sponge iron is used again in the run-down phase and during the heating of the fluidized bed reactors.

In the melt-down gasifier 8, a CO- and $H_2$-containing reduction gas is generated from coal and oxygen-containing gas in a melt-down gasification zone 8a and is drawn off from the melt-down gasifier by means of a reduction gas discharge line 12. After flowing through a hot-dedusting plant 13, the predominant quantity fraction of the reduction gas processed in this way is conducted via reduction gas connecting lines 14a, in countercurrent to the throughflow of ore, first into and through the final reduction stage of the fluidized bed reactor 3 and, subsequently, through the reduction gas connecting lines 14b and 14c into and through the fluidized bed reactors 2 and 1.

The fine dust separated in the hot-dedusting plant 13 is introduced into the melt-down gasifier 8 again via return lines 15.

The consumed reduction gas leaves the fluidized bed reactor 1 as blast furnace gas through the blast furnace gas line 16a and flows through a blast furnace gas scrubber 17 and, downstream of a compressor 18, through a $CO_2$ removal plant 19. A part stream of the blast furnace gas processed in this way is returned through the blast furnace gas line 16b and supplied in a metered manner to the reduction gas stream in the reduction gas connecting line 14a shortly before entry into the fluidized bed reactor 3. By means of a temperature measurement device 20, the instantaneous reduction gas temperature in the reduction gas connecting line 14a is measured before entry into the fluidized bed reactor 3, and the metered admixing of the processed blast furnace gas from the blast furnace gas line 16b takes place as a function of the optimal reduction gas temperature at the entry into the fluidized bed reactor 3 by means of a quantity regulation device 21 in the blast furnace gas line 16b.

A part stream of fresh reduction gas, after scrubbing in a scrubber 23, can be fed via a branch line 22 into the blast furnace gas line 16a upstream of a compressor 18, with the result that the operating conditions of the $CO_2$ removal plant 19 are improved.

Small part quantities of the processed reduction gas from the melt-down gasifier 8 are not conducted through the fluidized bed reactor 3 of the final reduction stage, but, instead, are delivered directly to the fluidized bed reactors 2 and 1 of the prereduction stage by means of reduction gas connecting lines 14d and 14e. The reduction gas connecting line 14d issues into the reduction gas connecting line 14b just upstream of the issue into the fluidized bed reactor 2, and the reduction gas connecting line 14e issues into the reduction gas connecting line 14c just upstream of the issue into the fluidized bed reactor 1. By fresh reduction gas being admixed to the reduction gas already partially consumed at least due to the flow through a fluidized bed reactor, both the quality of the reduction gas and its inlet temperature into the respective fluidized bed reactor 1 or 2 are raised correspondingly, with the result that the degree of prereduction is improved. For the metered admixing of the fresh reduction gas, the reduction gas connecting lines 14d, 14e are likewise assigned a quantity regulation device 21 and, if appropriate, the reduction gas connecting lines 14d, 14e are assigned a temperature measurement device 20 for the more accurate regulation of the admixing.

One or more conveying lines 9 for solid carbon carriers and an airline for oxygen-containing gases issue into the melt-down gasifier 8. In the melt-down gasifier 8, molten pig iron or molten steel intermediate material and molten slag collect beneath the melt-down gasification zone 8a and are tapped via taps 23, 24.

The invention claimed is:

1. A method for producing liquid pig iron or liquid steel intermediate products from fine-particled material containing iron oxide, the method comprising:

prereducing the fine-particled material containing iron oxide in at least one prereduction stage with the aid of a reduction gas, subsequently reducing the fine-particled material containing iron oxide to sponge iron in a final reduction stage;

melting the sponge iron in a melt-down gasification zone, along with supplying carbon carriers and oxygen-containing gas, such that a CO- and $H_2$-containing reduction gas is generated, introducing the reduction gas into the final reduction stage, converting the gas there, drawing off the gas and subsequently introducing the drawn off gas into at least one prereduction stage, converting the gas there and drawing off the gas;

introducing a quantity fraction of the fine-particled material containing iron oxide into a melt-down gasification zone via the at least one prereduction stage, and one final reduction stage, and introducing a further quantity fraction of the fine-particled material containing iron oxide into the melt-down gasification zone directly or together with the carbon carriers and the oxygen-containing gas;

subjecting the reduction gas emerging from the melt-down gasification zone to a hot dedusting to yield a processed reduction gas and subsequently supplying the processed reduction gas to the final reduction stage and to all the prereduction stages with an increased specific reduction gas quantity; and after the hot dedusting, setting the processed reduction gas at a higher temperature than is necessary for the finish reduction of the fine-particled material containing iron oxide in the final reduction stage, wherein the setting of the reduction gas temperature for the final reduction stage is by a metered addition of processed blast furnace gas drawn off from the at least one prereduction stage.

2. The method as claimed in claim 1, wherein the quantity fraction of the fine-particled material containing iron oxide, which is introduced into the melt-down gasification zone directly or together with the carbon carriers and the oxygen-containing gas is from 10% to 20% of an overall quantity of the fine-particled material containing iron oxide which is used.

3. The method as claimed in claim 1, further comprising: supplying the melt-down gasification zone with carbon carriers and oxygen-containing gas in a quantity such that a fraction of $CO_2$ in the reduction gas leaving the melt-down gasification zone lies in a range of 4% to 9%.

4. The method as claimed in claim 1, wherein after the hot dedusting, the setting of the processed reduction gas is at a temperature of 820° C. to 920° C.

5. A method for producing liquid pig iron or liquid steel intermediate products from fine-particled material containing iron oxide, the method comprising:

prereducing the fine-particled material containing iron oxide in at least one prereduction stage with the aid of a reduction gas, subsequently reducing the fine-particled material containing iron oxide to sponge iron in a final reduction stage;

melting the sponge iron in a melt-down gasification zone, along with supplying carbon carriers and oxygen-containing gas, such that a CO- and $H_2$-containing reduction gas is generated, introducing the reduction gas into the final reduction stage, converting the gas there, drawing off the gas and subsequently introducing the drawn off gas into at least one prereduction stage, converting the gas there and drawing off the gas;

introducing a quantity fraction of the fine-particled material containing iron oxide into a melt-down gasification zone via the at least one prereduction stage, and one final reduction stage, and introducing a further quantity fraction of the fine-particled material containing iron oxide into the melt-down gasification zone directly or together with the carbon carriers and the oxygen-containing gas;

subjecting the reduction gas emerging from the melt-down gasification zone to a hot dedusting to yield a processed reduction gas and subsequently supplying the processed reduction gas to the final reduction stage and to all the prereduction stages with an increased specific reduction gas quantity; and after the hot dedusting, supplying a part quantity of at least 70% of the processed reduction gas to the final reduction stage and also supplying a part quantity of up to 30% of the processed reduction gas directly to the prereduction stages.

6. The method as claimed in claim 5, wherein 5% to 15% of the processed reduction gas is admixed to the reduction gas leaving the final reduction stage, before entry into the preceding prereduction stage.

7. A method for producing liquid pig iron or liquid steel intermediate products from fine-particled material containing iron oxide, the method comprising:

prereducing the fine-particled material containing iron oxide in at least one prereduction stage with the aid of a reduction gas, subsequently reducing the fine-particled material containing iron oxide to sponge iron in a final reduction stage;

melting the sponge iron in a melt-down gasification zone, along with supplying carbon carriers and oxygen-containing gas, such that a CO- and $H_2$-containing reduction gas is generated, introducing the reduction gas into the final reduction stage, converting the gas there, drawing off the gas and subsequently introducing the drawn off gas into at least one prereduction stage, converting the gas there and drawing off the gas;

introducing a quantity fraction of the fine-particled material containing iron oxide into a melt-down gasification zone via the at least one prereduction stage, and one final reduction stage, and introducing a further quantity fraction of the fine-particled material containing iron oxide into the melt-down gasification zone directly or together with the carbon carriers and the oxygen-containing gas; and extracting a part of the sponge iron produced in the final reduction stage and cooling that part.

8. The method as claimed in claim 7, further comprising extracting a part quantity of about 5% to 15% of the generated overall quantity of sponge iron from the final reduction stage and cooling the part quantity extracted.

* * * * *